United States Patent [19]

Van Amstel

[11] Patent Number: 5,148,324
[45] Date of Patent: Sep. 15, 1992

[54] MIRROR UNIT

[75] Inventor: Willem D. Van Amstel, Eindhoven, Netherlands

[73] Assignee: U.S. Philips Corp., New York, N.Y.

[21] Appl. No.: 814,336

[22] Filed: Dec. 26, 1991

[30] Foreign Application Priority Data

Jan. 25, 1991 [NL] Netherlands ............... 9100121

[51] Int. Cl.[5] ............................................. G02B 5/10
[52] U.S. Cl. ..................................... 359/839; 359/846; 359/868; 359/871; 359/883
[58] Field of Search ............... 359/839, 846, 868, 869, 359/871, 883

[56] References Cited

U.S. PATENT DOCUMENTS

| | | | |
|---|---|---|---|
| 3,916,418 | 10/1975 | Erdmann et al. | 359/883 |
| 4,239,344 | 12/1980 | Wildenrotter | 359/883 |
| 4,420,223 | 12/1983 | Watanabe et al. | 359/871 |
| 4,487,196 | 12/1984 | Murphy | 359/871 |
| 4,932,768 | 6/1990 | Gobeli | 359/869 |

Primary Examiner—Bruce Y. Arnold
Assistant Examiner—J. P. Ryan
Attorney, Agent, or Firm—William L. Botjer

[57] ABSTRACT

A mirror unit (11) comprising a mirror holder (12) having a cylindrical support surface (13), and comprising a flexible mirror (14) having a mirror side (15) and a rear side (16); the mirror (14) which has been elastically deformed into a cylindrical mirror rests with its mirror side (15) directly on the support surface (13) of the mirror holder (14) without an intermediate layer, the mirror holder being provided with a shaft (17) which leaves open an optically directly and freely accessible region (19) at the mirror side (15) of the mirror (14) (front surface mirror), this region (19) acting as the functional mirror surface.

5 Claims, 2 Drawing Sheets

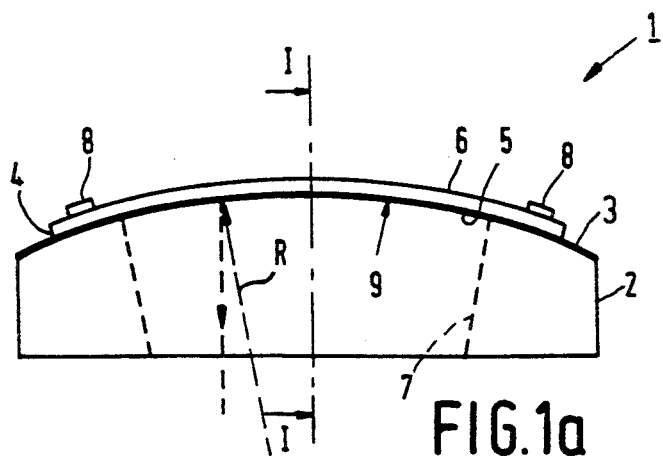
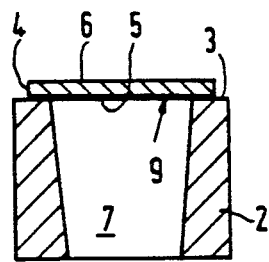
FIG.1a  FIG.1c
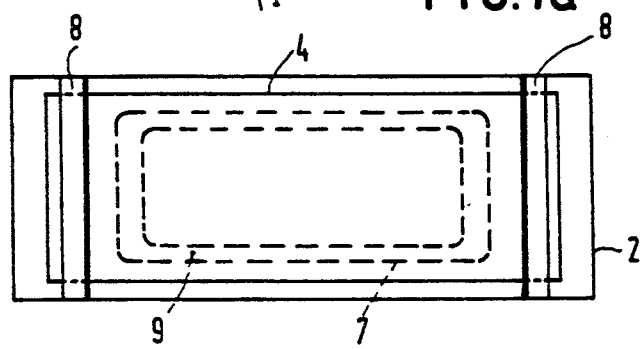
FIG.1b
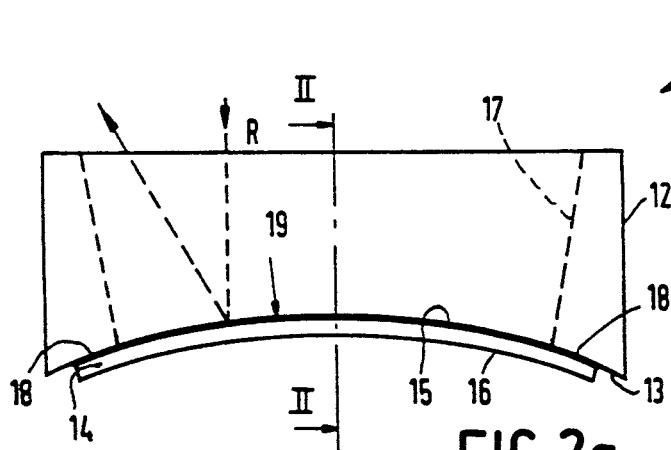
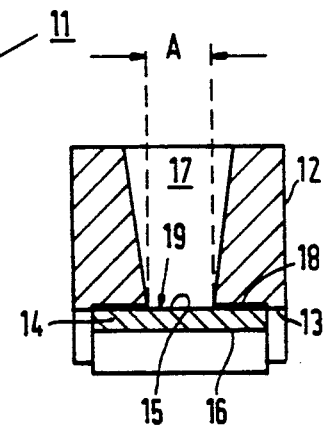
FIG.2a  FIG.2c
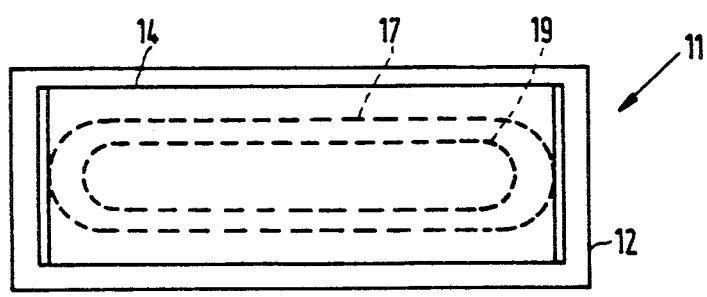
FIG.2b

MIRROR UNIT

The invention relates to a mirror unit comprising a fixed mirror holder having at least one curved support surface and comprising at least one flexible mirror having a mirror side and a rear side, at least a portion of the mirror side forming a functional mirror surface, while the mirror is fixed to the mirror holder and lies against the support surface of the mirror holder under elatic deformation.

The flexible mirror is so fastened on the mirror holder in the mirror unit according to the opening paragraph that the mirror assumes the shape of the curved support surface. The shape adaptation or shape change of the mirror is obtained through a mechanical elastic deformation. The overall geometric shape of the mirror is determined by the mirror holder, while the local optical quality of the functional mirror surface is obtained from the flexible mirror.

The construction of such a mirror unit is based on the insight that a cylindrical surface is automatically formed when a flexible plate is bent round, which surface has a much greater rigidity and resistance to deformation transverse to the bending direction than the same plate in a substantially plane condition.

The drawbacks which are inherent in other conventional techniques for the manufacture of curved mirrors are obviated in the manufacture of the said mirror unit. Thus, grinding and polishing of optical material such as glass, ceramic material or metal, is comparatively costly and requires a high degree of process control; the desired overall geometric accuracy in shape is obtainable only with difficulty by means of these cold processing techniques. The hot sagging method in its turn has the drawback that the shape of the required mould must be corrected for the final thickness of the deformed glass plate: thickness variations occur during sagging. Moreover, variations in shape of the mould occur during heating-up and cooling-down, which results in shape deformations and residual strain in the mirror.

The drawbacks mentioned above for the conventional cold and hot processing techniques do not occur in the assembly of the mirror unit according to the opening paragraph.

A mirror unit as described in the opening paragraph is known from Japanese Patent Application 59-72401(A) laid open to public inspection. In this known mirror unit, the flexible mirror lies with its mirror side against the mirror holder with the interposition of two intermediate layers, i.e. a protective layer and an adhesive layer. The mirror, therefore, faces outward with the non-mirroring rear side and, accordingly, is optically accessible through the rear side only. The flexible mirror itself must be made of a transparent material in this known mirror unit. In addition, this material must be of optical quality. Very high requirements are imposed on the evenness of the thicknesses of the mirror and of the intermediate layers.

The invention has for its object to provide a mirror unit which has wider application possibilities compared with the known construction, an improved optical quality, while the various components may be made of several alternative materials.

According to the invention, this object is mainly achieved in that the mirror rests with the mirror side directly on the support surface without an intermediate layer and the mirror holder is provided with a slotted shaft, the mirror having an uncovered, exposed region at the mirror side which is optically directly accessible for optical radiation and which acts as the functional mirror surface.

Since the functional or effective portion of the mirror side itself is directly accessible for optical radiation without the intervention of a transparent material (front surface mirror), the mirror unit according to the invention satisfies very high optical quality requirements.

The flexible mirror is fastened or fixed on the mirror holder in the mirror unit according to the invention, so that accordingly the mirror holder still forms part of the final mirror unit. A new mirror holder is therefore necessary for every mirror unit. This potential disadvantage, however, is easy to overcome in practice on the one hand by means of inexpensive manufacturing methods for the manufacture of the mirror holder, such as, for example, die casting, and on the other hand by integrating the mirror holder itself with its suspension in the construction of the device of which the mirror unit is to form part.

Various known processing methods are suitable for the manufacture of the mirror holder, such as:

turning or boring (for circular cylindrical mirror shapes);

numerical milling or grinding;

copy milling or grinding.

By taking a die-cast mirror holder as the starting point, moreover, a considerable reduction in the processing time may be achieved. It will be possible in some cases to dispense with the final treatment of the mirror holder, for example, through the use of a precision die casting technique. Instead of metal, a, possibly reinforced, plastic composition may sometimes be chosen for the material of the mirror holder.

The shaft necessary for the optical accessibility may be provided in the mirror holder by, for example, a milling operation or by spark erosion. In a cast mirror holder, the shaft may already be integrated in the mould, while a mirror holder built up from components is an alternative possible method for obtaining the required optical accessibility.

Various materials are eligible for the flexible mirror itself, such as:

glass, drawn or ground and polished; this glass need not be of optical quality. The thickness should be so chosen that the bending radius required for the final cylindrical mirror is admissible. If so desired, the admissible maximum bending may be increased through chemical hardening of the glass plate;

synthetic material such as, for example, PMMA (polymethyl methacrylate). An advantage of such a synthetic material over glass is that microscopically small unevennesses in the mirror holder are better accommodated and levelled out;

plate metal.

The flexible mirror must be secured or fixed on the mirror holder. Many known techniques are suitable for fixing.

a) Mechanical Clamps along the edges of the mirror;

by means of a counterprofile which may be provided with an elastic coating and which will lie against the rear side of the mirror;

with bracing wires or with straps which are applied to the rear side of the mirror, while it is possible to provide an elastic layer of, for example, rubber and a sturdy tape between the bracing wires or straps and the mirror for an even distribution of the pressing force;

by means of clamps which are applied to the ends of the flexible mirror;

by the application of a pulling force to the ends of the flexible mirror; this method is mainly applicable in combination with a mirror holder having a convex support surface;

by the application of a pressure on the ends of the flexible mirror, as a result of which the latter tends to bend out and is forced into the correct shape by the mirror holder; this method is mainly applicable in combination with a mirror holder having a concave support surface.

b) Gluing

Gluing is preferable especially for batch production because of the cost price. The advantage of gluing, moreover, is that no deforming external forces are exerted on the mirror holder during the subsequent functional use of the mirror unit. The mechanical pressing methods mentioned above may be used during curing of the glued connection, such as, for example, pressing with a counterprofile or a strap. A combined operation is possible for this such as, for example, gluing and applying clamps to the ends of the mirror, or gluing and applying a strap under a slight prestress as an extra safeguard and/or to ease the load on the glued connection.

c) Vacuum Fixation

A very even clamping of the flexible mirror on the mirror holder may be obtained in that the cylindrical support surface of the mirror holder is provided with vacuum grooves or chambers which are connected to a vacuum line. The advantage of this type of fixation is that a clamping is realised which is closed by force inside the mirror holder, i.e. the mirror holder is not deformed by external forces. One of the said mechanical fixation methods may be used as an additional clamping by way of extra safety measure to prevent the mirror detaching itself from the mirror holder if the vacuum should inadvertently fail.

Thanks to the possibility of manufacturing and assembling the mirror unit according to the invention in a comparatively inexpensive way on the one hand, and in view of the high optical quality level which can be obtained on the other hand, the mirror unit according to the invention is particularly suitable for use in scientific equipment such as spectrometers, spectrographs, laser scanners, etc. For example, the mirror unit according to the invention may be used in a laser scanner as described in European Patent Application 0 351 011 by Applicant.

The invention mainly relates to a mirror unit comprising a cylindrical mirror, i.e. a mirror whose mirroring surface is formed by the curved surface of a body of revolution having a straight generator. The cylindrical mirror may have a convex or a concave mirroring surface. The mirroring surface may have either a hyperbolic cylindrical or a parabolic cylindrical geometric shape. The flexible mirror may also have a cone shape for certain applications. The invention may be used for all mirrors which have the shape of bodies generated by straight generator lines.

A preferred embodiment of the mirror unit according to the invention is characterized in that the mirror holder has a convex support surface, while the functional mirror surface of the mirror is concave. In this embodiment, the flexible mirror is supported at all four sides by the support surface of the mirror holder. The mirror is tautly tensioned over the shaft of the mirror holder and exhibits the desired curvature, i.e. a curvature identical to that of the mirror holder.

In another preferred embodiment of the mirror unit according to the invention, the mirror holder has a concave support surface, while the functional mirror surface of the flexible mirror is convex. In this embodiment, the flexible mirror is pressed with its mirror side against the concave support surface of the mirror holder and is thus given a convex shape.

In the mirror unit according to the invention, a mirror is required whose width is considerably greater than the width of the shaft in the relevant mirror holder in order to obtain a certain desired functional mirror surface. There is a risk of inadmissible transverse sagging of the functional, non-supported mirror surface in the case of a mirror holder having a very wide shaft. The extent of a possible transverse sagging also depends on the curvature and on the material of the mirror itself. The transverse sagging risk is negligible in an embodiment of the mirror unit having a comparatively narrow shaft in the mirror holder, which embodiment is accordingly particularly suitable for certain application such as laser scanners and spectrometers in which only a functional mirror surface of a comparatively small width is required.

Any inadmissble transverse sagging of the mirror can be counteracted by optical correction in some applications. In the case of a mirror having a convex mirror surface, sagging of the mirror can be prevented by the exertion of a suitably chosen mechanical counterpressure on the rear side of the flexible mirror over that portion where it is not supported at the mirror side. To this end, a further preferred embodiment of the mirror unit according to the invention is characterized by a pressure element having a convex pressure surface whose profile corresponds to the profile of the concave support surface of the mirror holder, which pressure element bears with its pressure surface on the rear side of the flexible mirror. The functional mirror surface of the flexible mirror, or even the entire mirror, is fully supported at the rear side by the pressure element, so that sagging of the mirror is impossible.

Preferably, the pressure element is provided with an elastic layer which is applied to the convex pressure surface and which is in contact with the rear side of the flexible mirror. An even support of the mirror is obtained through this elastic layer and any irregularities in the thickness of the mirror and of the pressure surface of the pressure element are compensated for. The elastic intermediate layer may be made of any suitable material, for example, rubber.

The invention will be explained in more detail with reference to the drawing. In the drawing:

FIGS. 1a, 1b and 1c show an embodiment of the mirror unit according to the invention in side elevation, plan view, and cross-section taken on the line I—I in FIG. 1a, respectively;

FIGS. 2a, 2b and 2c show another embodiment of the mirror unit in side elevation, bottom view, and cross-section taken on the line II—II in FIG. 2a, respectively;

Figure 3A:
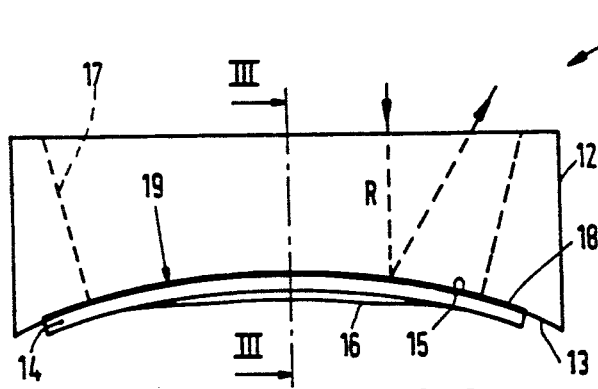
FIGS. 3a, 3b and 3c show a further embodiment of the mirror unit in side elevation, plan view, and cross-section taken on the line III—III in FIG. 3a, respectively.

The mirror unit 1 shown in FIGS. 1a, 1b and 1c comprises a mirror holder 2 having a convex support surface 3 and a flexible mirror 4 having a concave mirror side 5 and a convex rear side 6. A slotted shaft 7, which becomes wider towards the mirror 4, is provided in the mirror holder 2. The flexible mirror 4 is secured on the mirror holder 2 under elastic deformation by means of two clamping strips 8, one at each end of the mirror 4, and rests directly with its mirror side 5 on the support surface 3 of the mirror holder 2 without any intermediate layer and over its entire circumference in such a way that the concave mirror side 5 has exactly the same curvature as the convex support surface 3 of the mirror holder 2. The exposed region 9 on the mirror side 5 of the mirror 4 left open by the shaft 7 is optically freely accessible through the shaft 7 for light beams R and acts as a functional mirror surface.

FIGS. 2a, 2b and 2c show a mirror unit 11 in a different embodiment with a mirror holder 12 provided with a concave support surface 13, on which support surface a flexible mirror 14 rests with its mirror side 15. The mirror 14 is elastically deformed and secured on the mirror holder 12 in such a way that the convex mirror side 15 exactly assumes the shape of the concave support surface 13 of the mirror holder 12. The rear side 16 of the mirror 14 is exposed. The mirror holder 12 is provided with a comparatively narrow shaft 17 with a smallest width A at the level of the mirror 14. A non-covered region 19 on the mirror side 15 of the mirror 14 is optically freely accessible for optical radiation R through the shaft 17, this region acting as an effective mirror surface. In this embodiment the flexible mirror 14 could also be secured on the mirror holder 17 by means of clamping strips. In this case, however, several clamping strips distributed over the mirror length would have to be provided. In the present embodiment, the mirror is fastened on the mirror holder 12 by means of a single continuous glued connection or several glued connections 18 distributed over the mirror circumference.

Figure 3C:
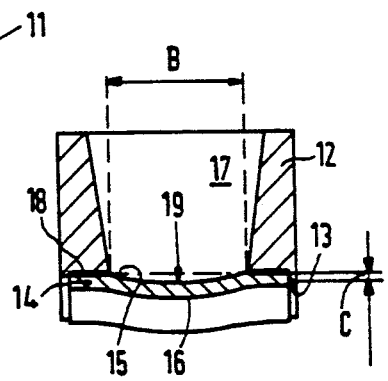
Figure 3B:
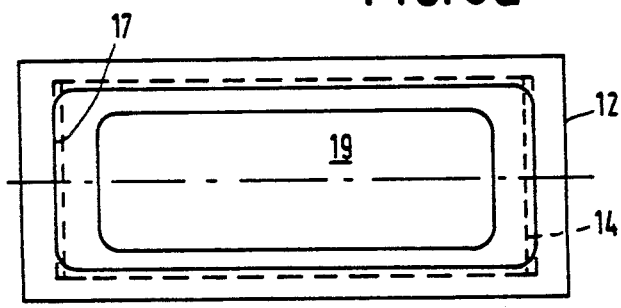

The mirror unit shown in FIGS. 3a, 3b and 3c is in essence the same as the mirror unit 11 of FIGS. 2a, 2b and 2c; which is why the various components of these two embodiments have the same reference numerals.

Figure 4A:
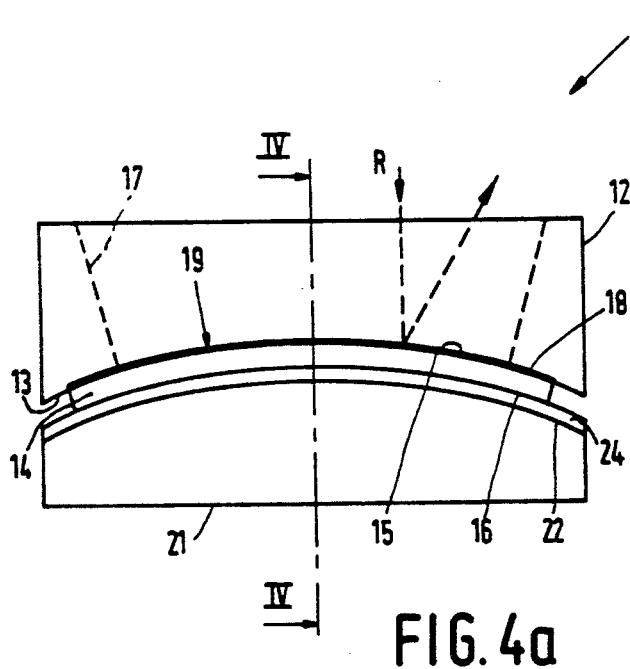
FIGS. 4a and 4b show the mirror unit in a final embodiment in side elevation and in cross-section taken on the line IV—IV in FIG. 4a, respectively.
Figure 4B:
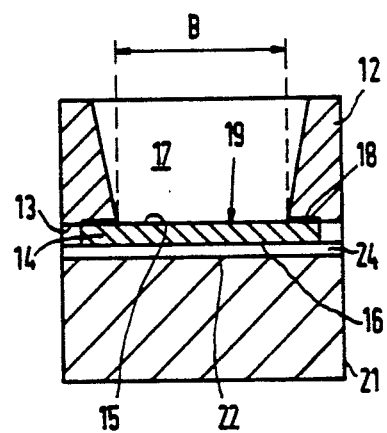

A comparison of FIGS. 2c and 3c shows that in the latter embodiment the width B of the shaft 17 at the level of the mirror 14 is considerably greater than the width A of the shaft in the embodiment of FIG. 2c. C indicates the possible transverse sagging of the functional, non-supported portion of the mirror 14, which sagging takes place as a result of the comparatively great width B of the shaft 17 and of the functional mirror surface 19. As was pointed out above, such a sagging can be counteracted by an optical correction in certain applications. Sagging of the mirror, however, is prevented with certainty in the embodiment of FIGS. 4a and 4b, which embodiment corresponds to the embodiment shown in FIGS. 3a, 3b and 3c, but with an added component, i.e. a pressure element 21. This pressure element 21 is provided with a convex pressure surface 22 whose profile corresponds to the profile of the concave support surface 13 of the mirror holder 12. The pressure element 21 forms a kind of counterprofile and rests with the pressure surface 22 against the rear side 16 of the mirror 14, thus exerting a mechanical counterpressure on the mirror 14 at least over that portion of the mirror 14 at the non-supported mirror side which corresponds to the functional mirror surface 19 of the mirror. In the embodiment shown, the pressure element 21 is provided with an elastic layer 24, for example of rubber, which is applied to the pressure surface 22.

The pressure element in this embodiment may also be used for securing or fixing of the mirror 14 on the mirror holder 12. It is sufficient for this purpose to connect the pressure element 21 in a suitable manner to the mirror holder 12, for example by screwing down.

The mirror holder and the mirror may be manufactured from one of the materials listed above and by one of the methods described above to obtain the various embodiments of the mirror unit according to the invention as described. In addition to the methods for securing or fixing the mirror in the embodiments described, one of the alternative fixation techniques may be used as described earlier.

In assembling the mirror unit according to the invention, furthermore, a good transition of the bending curve into a straight line should be taken into account. For this purpose, a portion should be added to the optically functional portion of the bending curve on either side thereof in which a continuous transition (in the first, second, third and fourth derivative) takes place to a straight outer end. The mirror holder and the mirror should therefore be chosen to be correspondingly longer than the length which is necessary for the optical function. It can be prevented in this way that the bending moment in the mirror to be tensionmounted becomes too high at the ends and leads to plastic deformation or even to fracture.

I claim:

1. A mirror unit comprising a fixed mirror holder having at least one curved support surface and comprising at least one flexible mirror having a mirror side and a rear side, at least a portion of the mirror side forming a functional mirror surface, while the mirror is fixed to the mirror holder and lies against the support surface of the mirror holder under elastic deformation, characterized in that the mirror rests with the mirror side directly on the support surface without an intermediate layer and the mirror holder is provided with a slotted shaft, the mirror having an uncovered, exposed region at the mirror side which is optically directly accessible for optical radiation and which acts as the functional mirror surface.

2. A mirror unit as claimed in claim 1, characterized in that the mirror holder has a convex support surface, while the functional mirror surface of the mirror is concave.

3. A mirror unit as claimed in claim 1, characterized in that the mirror holder has a concave support surface, while the functional mirror surface of the flexible mirror is convex.

4. A mirror unit as claimed in claim 3, characterized by a pressure element having a convex pressure surface whose profile corresponds to the profile of the concave support surface of the mirror holder, which pressure element bears with its pressure surface on the rear side of the flexible mirror.

5. A mirror unit as claimed in claim 4, characterized in that the pressure element is provided with an elastic layer on its pressure surface.

* * * * *